United States Patent [19]
Yamada

[11] 3,805,818
[45] Apr. 23, 1974

[54] SAFETY VALVE DEVICE TO BE AUTOMATICALLY CLOSED BY VIBRATIONS

[76] Inventor: Masafusa Yamada, 10-9 3-chome Azumabashi,, Sumida-ku, Tokyo, Japan

[22] Filed: Oct. 17, 1972

[21] Appl. No.: 298,326

[30] Foreign Application Priority Data
Oct. 19, 1971  Japan................................ 46-82158
Apr. 7, 1972   Japan................................ 47-34488

[52] U.S. Cl. ................................................. 137/38
[51] Int. Cl. ............................................ F16k 17/36
[58] Field of Search ................................ 137/38, 39

[56] References Cited
UNITED STATES PATENTS
1,742,685  1/1930  Brandon ............................. 137/38
2,615,461  10/1952 Crow .................................. 137/39
2,853,089  9/1958  Bair .................................... 137/39

*Primary Examiner*—Robert G. Nilson
*Attorney, Agent, or Firm*—Flynn & Frishauf

[57] ABSTRACT

A safety valve device is automatically closed upon the occurrence of sudden vibrations such as an earthquake. The device includes a weight in a housing, which may be shifted due the vibrations so as to close the housing through an actuating arm.

10 Claims, 2 Drawing Figures

SAFETY VALVE DEVICE TO BE AUTOMATICALLY CLOSED BY VIBRATIONS

BACKGROUND OF THE INVENTION

This invention relates to a valve device and more particularly to a safety valve to be automatically closed by sudden vibrations such as an earthquake.

Such a safety valve is incorporated in some sort of device supplied with an energy medium such as gas, petroleum or electricity from an energy source in such a manner that upon generation of a sudden vibration, the valve is automatically closed to stop the supply of the energy medium from the source, thereby preventing the occurrence of any accident associated with the energy medium.

It is an object of the invention to provide a safety valve device of a simple construction which may be surely operated to stop the supply of energy medium upon the occurrence of sudden vibrations.

SUMMARY OF THE INVENTION

According to the present invention, a safety valve device comprises a housing having a main chamber and two openings through which a fluid energy medium passes and a valve mechanism provided in the housing for selectively preventing the passage of the energy medium through the housing. The valve mechanism preferably includes a reciprocal shaft mounted coaxially with the openings, a closing member mounted on one end of the shaft, a spring receiving member preferably mounted near the other end of the shaft and a compression spring urging the reciprocal shaft toward said other end of the shaft to selectively close a first of the openings with the closing member of the valve. Further included in the valve device is an actuating arm connected to the closing member of the valve for selectively moving the closing member to a closed state, one end of the arm being pivoted on the spring receiving member and the arm having a portion which is engagable with the housing to selectively open the first opening of the housing against the force of the compression spring. A weight member, which is shiftable in position responsive to vibrations, is provided for actuating the arm by being shifted when vibrated.

PREFERRED EMBODIMENT OF THE INVENTION

Figure 1:
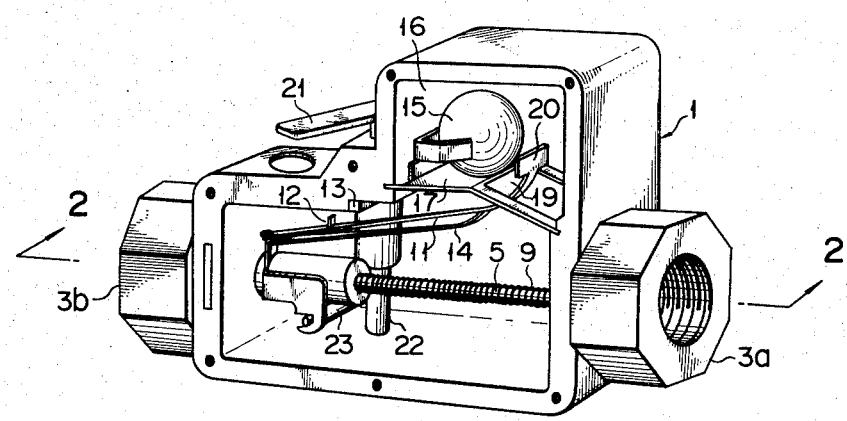
FIG. 1 is a schematic perspective view of an embodiment of a safety valve device according to the invention.

Referring to the figures, a hollow housing 1 has a main chamber 16 having openings 2a and 2b formed in the central portion of the opposite side walls thereof. Connecting nuts 3a and 3b are outwardly mounted on the side walls in coaxial relationship with the openings 2a and 2b. One nut 3a is to be connected to an energy supply source of fluid energy medium such as gas or petroleum (not shown) through a pipe, and the other nut 3b to a burning mechanism such as a burner (not shown) through another pipe.

In the housing 1 there is provided a valve mechanism 4 to selectively open and close the passing opening 2a.

The mechanism 4 includes a reciprocal shaft 5 being movable along its horizontal axis and closing member 6 mounted on the end of the shaft 5 and having a seal therearound. The reciprocal shaft 5 is inserted through holes 8a and 8b of two holding plates 7a and 7b which are respectively provided in the openings 2a and 2b to allow the fluid medium to be passed therethrough. When the shaft 5 is moved toward one direction, i.e., the left side of the drawing, the opening 2a is closed by the closing plate 6 so that passing of the fluid is prevented, and this closed state is maintained until the shaft 5 is moved in the other direction (i.e., to the right side). The reciprocal shaft 5 is urged in one direction by a main compression coil spring 9 mounted around the shaft, one end 9a of which is connected to the inner side of the supporting plate 7a and the other end 9b of which is abutted on the inner face of a spring receiving box 10 slidably mounted on the end portion of the shaft 5.

In the box 10, there is inserted an auxiliary compression coil spring 9c between a flange 5a of the shaft 5 and the inner side face of the box 10 to urge the shaft 5 and box 10 in the opposite directions. The spring 9c determines the force with which closing member 6 is pressed against the valve seat of plate 7a. For example, if the resilient force of the spring 9c is made much smaller than that of the spring 9, first the shaft 5 is urged to the left by the strong spring 9 and thereafter the closing member 6 is urged by the weak spring 9c onto the supporting plate 7a at the opening side. This means that the closing member 6 is urged by the smaller resilient force of the spring 9c when it touches the plate 7a. In other words, the spring 9c urges the member 6 onto the plate 7a with so small a force that both the member 6 and the plate 7a are not damaged and worn out.

In the normal state, the valve mechanism 4 is held to open the opening 2a by the following mechanisms. The spring receiving member 10 is provided with a flange 10a at which one end of a swingable arm 11 is pivoted. The arm 11 is upwardly urged in a counterclockwise direction by an L-shaped flat spring 14, one end 14a of which is connected to the flange 10a of the spring receiver 10 and the other end 14b of which presses the center part of the arm 11. The other end 11b of the arm 13 is extended into the chamber 16 through a slit 19 of a partition wall 17 formed on the housing 1 and has a curved receiving portion 20. The center of the arm 11 is formed with an engaging portion 12 which is engaged with an engaging step portion 13 of the upper wall of the housing so that the arm 11 and the reciprocal shaft 5 are prevented against the force of the spring 9 from movement in one direction. A spherical weight 15 is accommodated in the chamber 16 and is set on a hole 18 formed in the partition wall 17 remote from the curved portion 20 in a normal state.

Outward of the housing 1 there is provided a manually operable lever 21 of a return mechanism the base end of which is connected to one end of a vertical shaft 22. The other end of the shaft is extended into the housing 1 and terminated at the lower face thereof. A connecting rod 23 is extended from the lower portion of the vertical shaft and connected to the spring receiving member at its extended end so that when the lever 21 is swung the horizontal shaft 5 is moved in one direction against the force of the coil spring 9 and thus the arm 11 returns to an original position.

OPERATION

Figure 2:
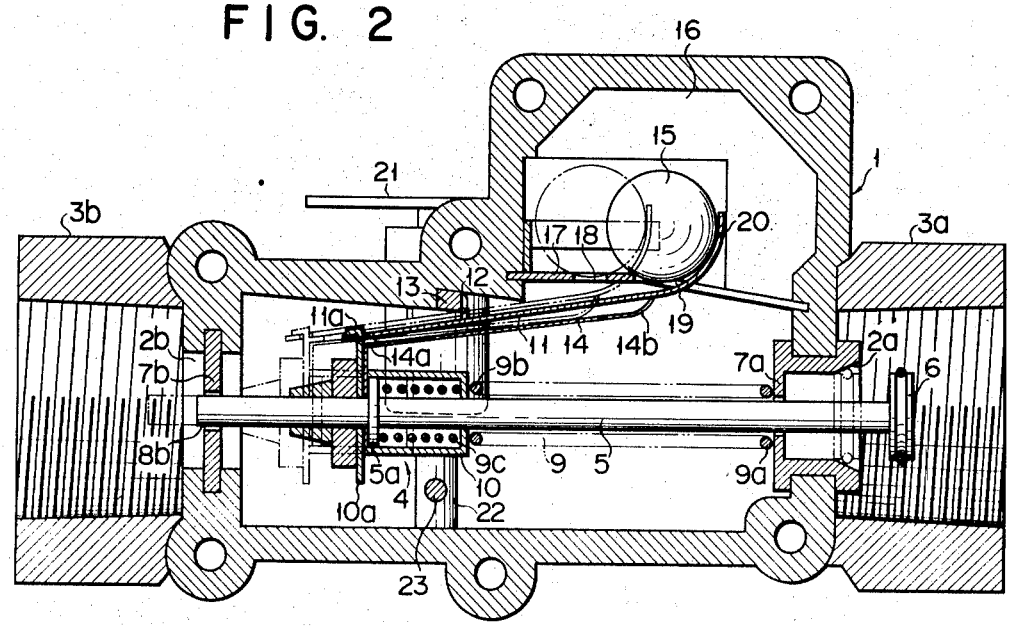
FIG. 2 is a cross sectional view on line 2—2 of FIG. 1.

In a normal state as shown by solid lines in FIG. 2, the fluid energy medium such as gas or petroleum is supplied to a desired portion from the source through the inlet opening 2a, the main chamber of the housing 1 and the outlet opening 2b. When the device is subjected to a sudden vibration such as an earthquake, the spherical weight 15 detects the vibration to roll down from the receiving hole 18 of the partition wall 17 and is received by the curved portion 20 of the actuating arm 12 as shown by dotted lines. The arm 12 is swung in a clockwise direction by the inertia and weight of the spherical weight 15, against the force of the flat spring 14, thereby resulting in the release of the engaging relation between the engaging portions 12 and 13 to free the arm 11 from the housing 1. Accordingly, the arm 11 and shaft 5 are moved to the left side (in the Figures) by the force of the coil springs 9 and 9c so that the inlet opening 2a is closed by the closing plate 6 to stop the supply of the fluid energy medium. Accompanying with the slide of the arm, the spherical weight 15 is returned by the pressing force of the curved portion 20.

When the device is desired to be returned to an original state passing the fluid energy medium therethrough, the operating lever 21 is manually swung so that the shaft 5 is moved to the right side to open the inlet opening 2a against the force of the coil spring 9 and to engage the portion 12 of the arm 11 with the step portion 13 of the housing 1.

In the case of using electricity as an energy medium, a pair of electrical contacts are so arranged that the contacts may be selectively connected to each other according to the movement of the reciprocal shaft 5.

What is claimed is:
1. A safety valve decice comprising:
   a housing having a main chamber and two openings through which a fluid energy medium passes;
   a valve mechanism provided in the housing for selectively preventing the passage of the energy medium through the housing, said valve mechanism including a reciprocal shaft mounted coaxial with said openings, a closing member mounted on one end of said reciprocal shaft, a spring receiving member mounted on said reciprocal shaft, and a compression spring urging said reciprocal shaft toward the other end of said reciprocal shaft to close a first of the openings with said closing member;
   an actuating arm in said housing and coupled to said closing member of the valve mechanism to selectively move said closing member to the closed state, one end of said arm being pivoted on said spring receiving member, and said arm having an engaging portion engagable with the housing to selectively open said first opening against the force of the compression spring; and
   a weight member which is shiftable in position responsive to vibrations for actuating said arm by being shifted when vibrated to thereby cause said arm to pivot.

2. The safety valve device according to claim 1 wherein said housing has a weight member accomodating chamber partitioned from the main chamber by a partition wall on which the weight member is set and said arm has a curved end passing through the partition wall and extended into the weight member accommodating chamber to face the weight member, whereby when the weight member is shifted, the curved portion receives the weight member and the engagement of the arm and housing is released to close the opening.

3. The safety valve device according to claim 2 wherein the partition wall has a receiving hole and the weight member comprises a spherical weight positioned in the receiving hole of the partition wall.

4. The safety valve device according to claim 3 which further includes returning means returning the reciprocal shaft to a position to open the opening.

5. The safety valve device according to claim 4 wherein said returning means includes a manually operable swingable lever positioned outside the housing, a rotatable shaft connected to the lever at one end and having the other end extending into the housing and a connecting rod to connect the reciprocal shaft and the other end of the rotatable shaft whereby when the lever is swung the reciprocal shaft is moved to open the opening.

6. The safety valve device according to claim 5 wherein the spring receiving member is a box member through which the reciprocal shaft is slidably inserted and in which a second compression spring is mounted to urge the reciprocal shaft and box member in opposite directions.

7. The safety valve device according to claim 1 wherein the spring receiving member is a box member through which the reciprocal shaft is slidably inserted and in which a second compression spring is mounted to urge the reciprocal shaft and box member in opposite directions.

8. The safety valve device according to claim 7 wherein said second compression spring urges the reciprocal shaft member in a direction opposite the urging direction of said first-mentioned compression spring.

9. The safety valve device according to claim 7 wherein said second compression spring determines the force with which said closing member closes said first opening.

10. The safety valve device according to claim 1 wherein said spring receiving member is mounted near said other end of said reciprocal shaft.

* * * * *